United States Patent [19]
Seo

[11] Patent Number: 5,999,363
[45] Date of Patent: Dec. 7, 1999

[54] CASSETTE HOUSING HAVING CASSETTE STOPPERS TO PREVENT MIS-INSERTION

[75] Inventor: Jae-kab Seo, Suwon, Rep. of Korea

[73] Assignee: Samsung Electronics Co., Ltd., Rep. of Korea

[21] Appl. No.: 09/103,829

[22] Filed: Jun. 24, 1998

[30] Foreign Application Priority Data

Jun. 25, 1997 [KR] Rep. of Korea ........................ 97-27331

[51] Int. Cl.$^6$ ................................................. G11B 5/008
[52] U.S. Cl. ............................................................ 360/96.5
[58] Field of Search ................................. 360/96.5, 96.6, 360/85

[56] References Cited

U.S. PATENT DOCUMENTS 5,053,902 10/1991 Kato ....................................... 360/96.5

*Primary Examiner*—A. J. Heinz
*Attorney, Agent, or Firm*—Dilworth & Barrese

[57] ABSTRACT

A cassette housing assembly of a tape recorder is provided including a cassette housing having an upper surface portion, side surface portions, and a lower surface portion having a fixed stopper formed at one side thereof. The housing forms a space for receiving a cassette. A mobile stopper is installed on the lower surface of the upper surface portion of the cassette housing member to be capable of moving along the lower surface. A spring is coupled to one side of the lower surface of the upper surface portion of the cassette housing member and to one side of the mobile stopper to bias the mobile stopper. The cassette housing assembly minimizes damages to the cassette housing assembly due to incorrect insertion of the cassette can be prevented and a user can easily recognize mis-insertion of the cassette.

20 Claims, 5 Drawing Sheets

1

CASSETTE HOUSING HAVING CASSETTE STOPPERS TO PREVENT MIS-INSERTION

BACKGROUND OF THE INVENTION

1. Field of the Invention

The present invention relates to a cassette housing assembly of a tape recorder, and more particularly, to a cassette housing assembly of a tape recorder having an apparatus for preventing an incorrect insertion of a cassette in the cassette housing by being upside down.

2. Description of the Related Art

A tape recorder is for recording/reproducing audio or video information on/from a magnetic tape. In the tape recorder, a cassette housing assembly is provided to load a cassette onto a deck. When a cassette is inserted into a cassette housing assembly and a switch is turned on, the driving of the cassette housing assembly begins and the cassette is placed at a loading position on the deck.

FIG. 1 shows a deck of a tape recorder, more particularly, an 8 mm camcorder.

Referring to the drawing, a deck 10 includes a chassis assembly 11, a cassette housing assembly 12, a head drum assembly 13, and a loading mechanism 15. On the chassis assembly 11, installed are a reel disk assembly for running the magnetic tape of the cassette (not shown) by being inserted in a spool of the cassette and a head drum assembly 13 including a magnetic head (not shown). A space for receiving the cassette is formed in the cassette housing assembly 12. The cassette housing assembly 12 has an upper surface portion 12a, side surface portions 12b and 12b', and a lower surface portion 12c. The loading mechanism 15 is installed between the side surface portion 12b' of the cassette housing assembly 12 and the chassis assembly 11. The cassette housing assembly 12 is lowered by the loading mechanism 15 to a level of the chassis assembly 11 to load the cassette, or is lifted to unload the same.

In the cassette housing assembly of the tape recorder structured as above, an apparatus for preventing an incorrect insertion of a cassette is provided. A incorrect-insertion preventing function is usually performed by a stopper (not shown) which is installed at one side of the lower surface of the cassette housing assembly. For instance, when a cassette (not shown) is inserted in a normal state, the stopper is positioned in a groove provided between the leading portion of a main unit of the cassette and a cassette lid thereof. Next, when loading of the cassette begins, the cassette lid (not shown) is opened by a lid contact portion (not shown) formed on a side surface of the chassis, thus exposing a magnetic tape. When the cassette is incorrectly inserted, the stopper is not positioned into the groove and thus the cassette lid is not opened. As a result, the cassette can be correctly maintained in the cassette housing assembly.

FIG. 2 shows a cassette housing assembly according to the conventional technology. Referring to the drawing, the cassette housing assembly 22 includes an upper surface portion 22a, side surface portions 22b and 22b' respectively formed to the left and right sides of the upper surface portion 22a, and a lower surface portion 22c. A cassette is inserted in a direction indicated by arrow "C" into a space formed by the upper surface, side surface and lower surface portions 22a, 22b and 22b', and 22c. A fixed stopper 25 is installed at one side of the lower surface portion 22c. The fixed stopper 25 vertically protrudes from the plane of lower surface portion 22c.

FIGS. 3A to 3C are side views of the cassette housing assembly in which a cassette is inserted, viewing from a direction indicated by arrow "A" in FIG. 2.

Referring to FIG. 3A, a conventional cassette 38 has a main unit 38a, an outer lid 36 rotatably installed at a leading portion 38b of the main unit 38a, and an inner lid 37 rotatably installed with respect to the outer lid 36. The cassette 38 is inserted in a direction indicated by arrow "C" into a space defined by an upper surface portion 22a, side surface portions 22b and 22b', and a lower surface portion 22c of the cassette housing assembly 22. A groove (not shown) is provided between the leading portion 38b of the main unit 38a and the outer lid 36, as described in the above. Therefore, when a cassette is correctly inserted, the fixed stopper 25 shown in FIG. 2 is positioned in the groove and thus insertion of the cassette 38 into the cassette housing assembly 22 is not hindered.

FIG. 3B shows a state in which the cassette housing assembly is lowered to a level of the chassis assembly 11 (see FIG. 1). The cassette housing assembly 22 is lowered by the operation of the loading mechanism 15 (see FIG. 1). Here, the outer lid 36 and the inner lid 37 open by contacting a lid contact portion (not shown) formed at one side of the chassis assembly 11. Reference numeral 31 indicates a protrusion formed on the upper surface portion 22a of the cassette housing assembly 22. The inner lid 37 contacts the protrusion 31 as it rotates and moves backward.

FIG. 3C shows a state in which a cassette is inserted upside down. When the cassette is inserted upside down into the cassette housing assembly 22, the fixed stopper 25 is not positioned in the groove (not shown) provided between the cassette leading portion 38b and the cassette outer lid 36. Accordingly, as shown in the drawing, the cassette 38 slides along the upper surface of the fixed stopper 25. That is, since the main unit 38a of the cassette 38 is inserted into a restricted space of the cassette housing assembly 22 defined by the protrusion 31 and the fixed stopper 25, correct insertion of the cassette in the cassette housing assembly 22 cannot be performed. Also, a user determines whether the cassette is correctly inserted by examining a state of insertion thereof.

However, the above conventional apparatus for preventing an incorrect insertion of a cassette has the following disadvantages.

When a user incorrectly inserts the cassette 38 into the cassette housing assembly 22 even though the insertion of the cassette 38 may be prevented by the fixed stopper 25, the cassette almost enters in the cassette housing assembly 22 because there is an enough space inside the cassette housing assembly 22 for allowing the cassette to slide. In doing so, the surface of the cassette 38 may be scratched by the fixed stopper 25 and also the cassette can contact the other mechanisms or elements in the deck 10 and damage the same. Also, since a user usually determines whether the cassette is correctly inserted in the deck by checking the distance that the cassette is inserted into the deck, a misjudgment on whether the cassette has been correctly inserted may occur.

SUMMARY OF THE INVENTION

To solve the above problems, it is an objective of the present invention to provide a cassette housing assembly of a tape recorder having an apparatus for preventing incorrect insertion of a cassette into the housing.

Accordingly, to achieve the above objective, there is provided a cassette housing assembly of a tape recorder having an apparatus for preventing mis-insertion of a cassette comprising: a cassette housing having an upper surface portion, side surface portions, and a lower surface portion having a fixed stopper formed at one side thereof, forming a space for receiving a cassette; a mobile stopper installed on the lower surface of the upper surface portion of the cassette housing member to be capable of moving along the lower surface; and a spring coupled to one side of the lower surface of the upper surface portion of the cassette housing member and one side of the mobile stopper to bias the mobile stopper.

Preferably, the mobile stopper has a horizontal portion parallel to the upper surface portion of the cassette housing and a vertical portion extending from the opposite sides of the horizontal portion.

It is also preferable in the present invention that at least one slot is formed on the mobile stopper and a guide for guiding the movement of the mobile stopper by being inserted in the slot is maintained on the upper surface portion of the cassette housing.

It is also preferable in the present invention that the spring is installed between a hook formed on the mobile stopper and a hooking piece formed on the upper surface portion of the cassette housing to bias the mobile stopper in a direction inserting the cassette.

It is also preferred in the present invention that at least one point of the vertical portion of the mobile stopper is located directly above the fixed stopper when being biased in a direction inserting the cassette.

It is also preferred in the present invention that the shortest distance between the fixed stopper and the mobile stopper is less than the thickness of the cassette.

It is also preferred in the present invention that the mobile stopper can be transferred by an inner lid of the cassette against an elastic force of the spring when the cassette is inserted in the cassette housing in a normal state.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 4:
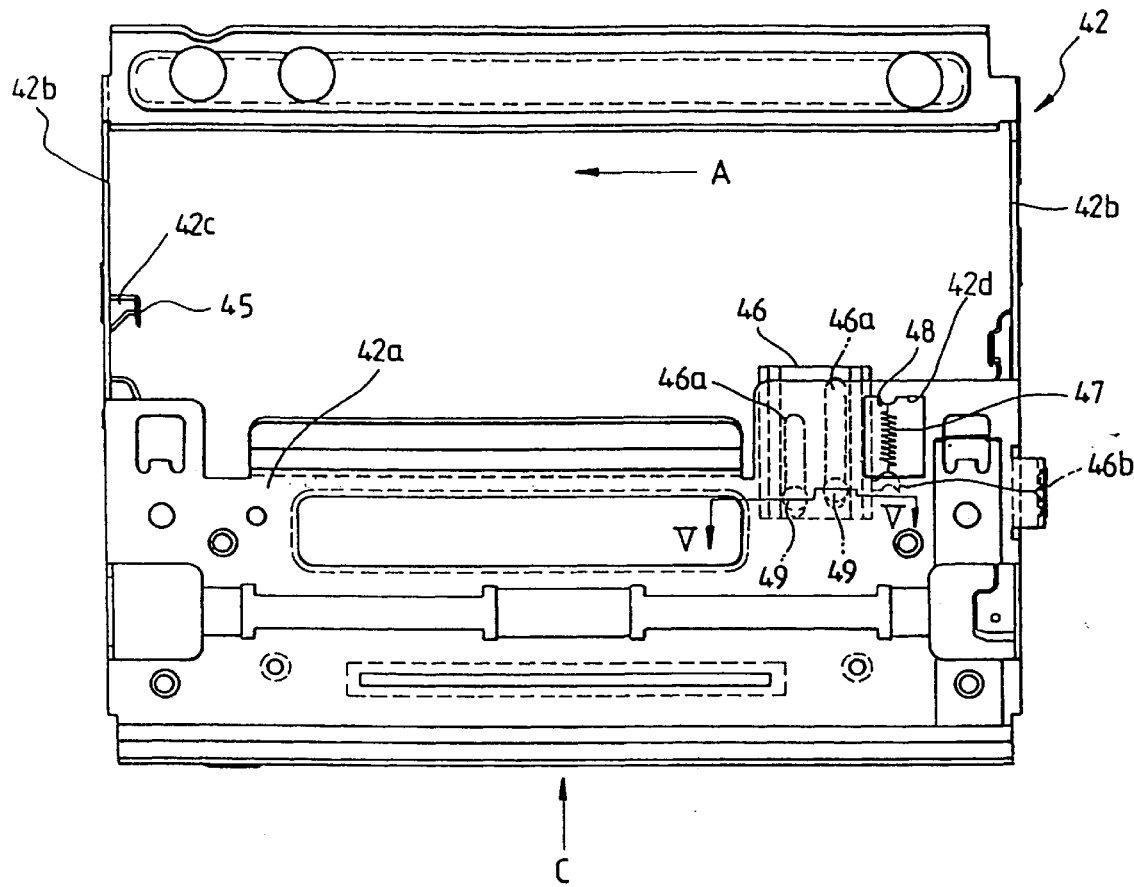
FIG. 4 is a plan view illustrating a cassette housing assembly according to the present invention.

In FIG. 4, a cassette housing assembly 42 includes an upper surface portion 42a, side surface portions 42b and 42b' formed to the left and right sides of the upper surface portion 42a, and a lower surface portion 42c. The upper, side and lower surface portions 42a, 42b and 42b', and 42c form a space for receiving a cassette and the cassette is inserted in the space in a direction indicated by arrow "C". A fixed stopper 45 is formed at one side of the lower surface portion 42c. Fixed stopper 45 vertically protrudes from the plane of the lower surface portion 42c.

According to a characteristic feature of the present invention, a mobile stopper 46 is installed at the lower surface of the upper surface portion 42a. The mobile stopper 46 is installed capable of moving a predetermined distance forward and backward on the lower surface of the upper surface portion 42a. The mobile stopper 46 is subject to an elastic force by a spring 47 in one direction. Reference numeral 42d represents an aperture formed in a portion of the upper surface portion 42a. The spring 47 is exposed through the aperture 42d. One end of the spring 47 is connected to a hook 46b extending from the mobile stopper 46 and the other end of the spring 47 is connected to a hooking piece 48 formed on the upper surface portion 42a. A pair of parallel slots 46a is formed on the mobile stopper 46 and a guide 49 is positioned in each slot. One end portion of the guide 49 is maintained at a predetermined position on the upper surface portion 42a. The mobile stopper 46 can move a predetermined distance on the lower surface of the upper surface portion 42a by movement of the slots 46a about guide 49.

Figure 5:
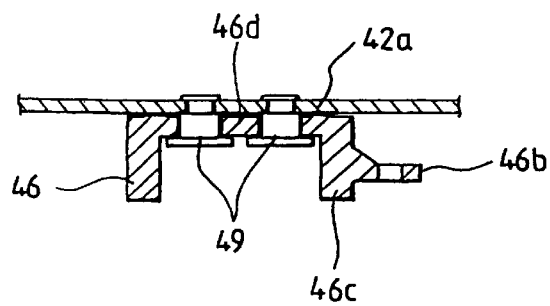
FIG. 5 is a sectional view taken along line V—V of FIG. 4.

FIG. 5 is a sectional view taken along line V—V of FIG. 4. Referring to the drawing, the mobile stopper 46 has a horizontal portion 46d extending parallel to the upper surface portion 42a of the cassette housing assembly 42 and a vertical portion 46c extending from each of the opposite sides of the horizontal portion 46d. The slot 46a of the mobile stopper 46 is formed on the horizontal portion 46d. Hook 46b is formed on the vertical portion 46c. The upper portion of the guide 49 is maintained on the upper surface portion 42a of the cassette housing assembly 42, and the lower portion of the guide 49 is formed greater than the width of the slot 46a. Therefore, the mobile stopper 46 cannot be detached from the lower portion of the guide 49.

Figure 6A:
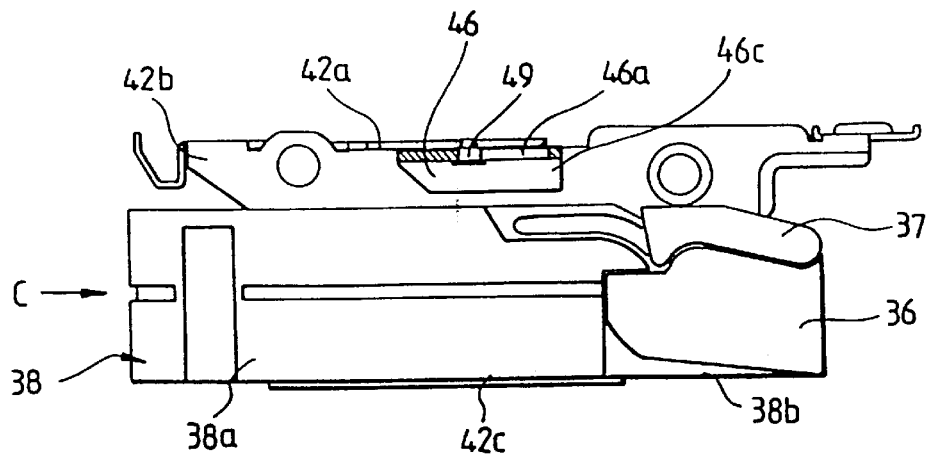
FIGS. 6A and 6B are side views of the cassette housing assembly shown in FIG. 4 in which a cassette is correctly inserted.
Figure 6B:
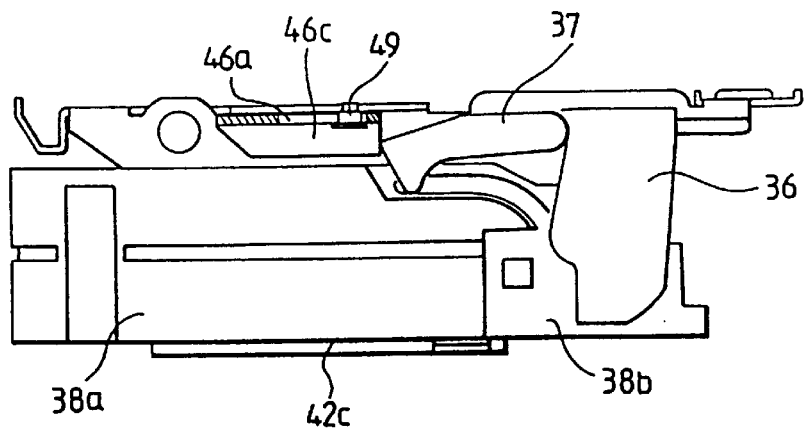
Figure 6C:
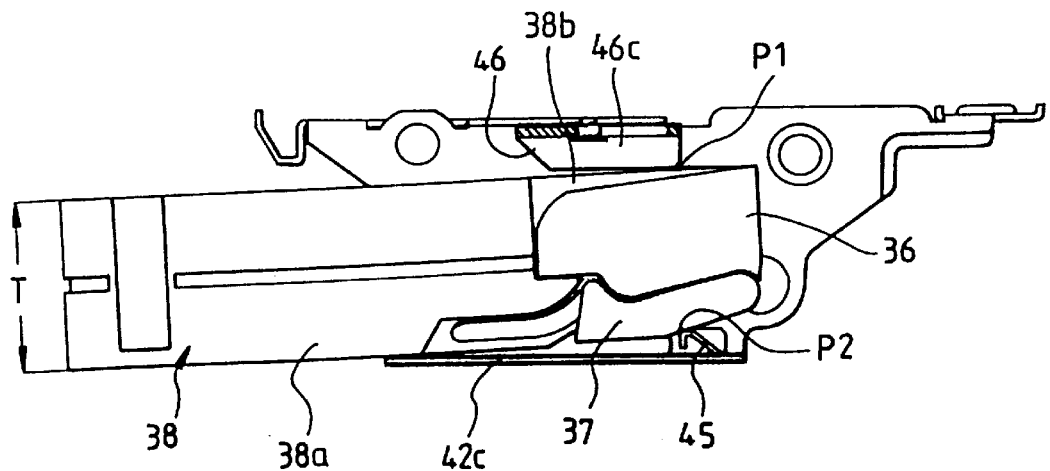
FIG. 6C is a side view of the cassette housing assembly shown in FIG. 4 in which a cassette is incorrectly inserted.

FIGS. 6A–6C show a cassette during insertion into a cassette housing assembly according to the present invention, viewed from the direction indicated by arrow "A" in FIG. 4.

Figure 1:
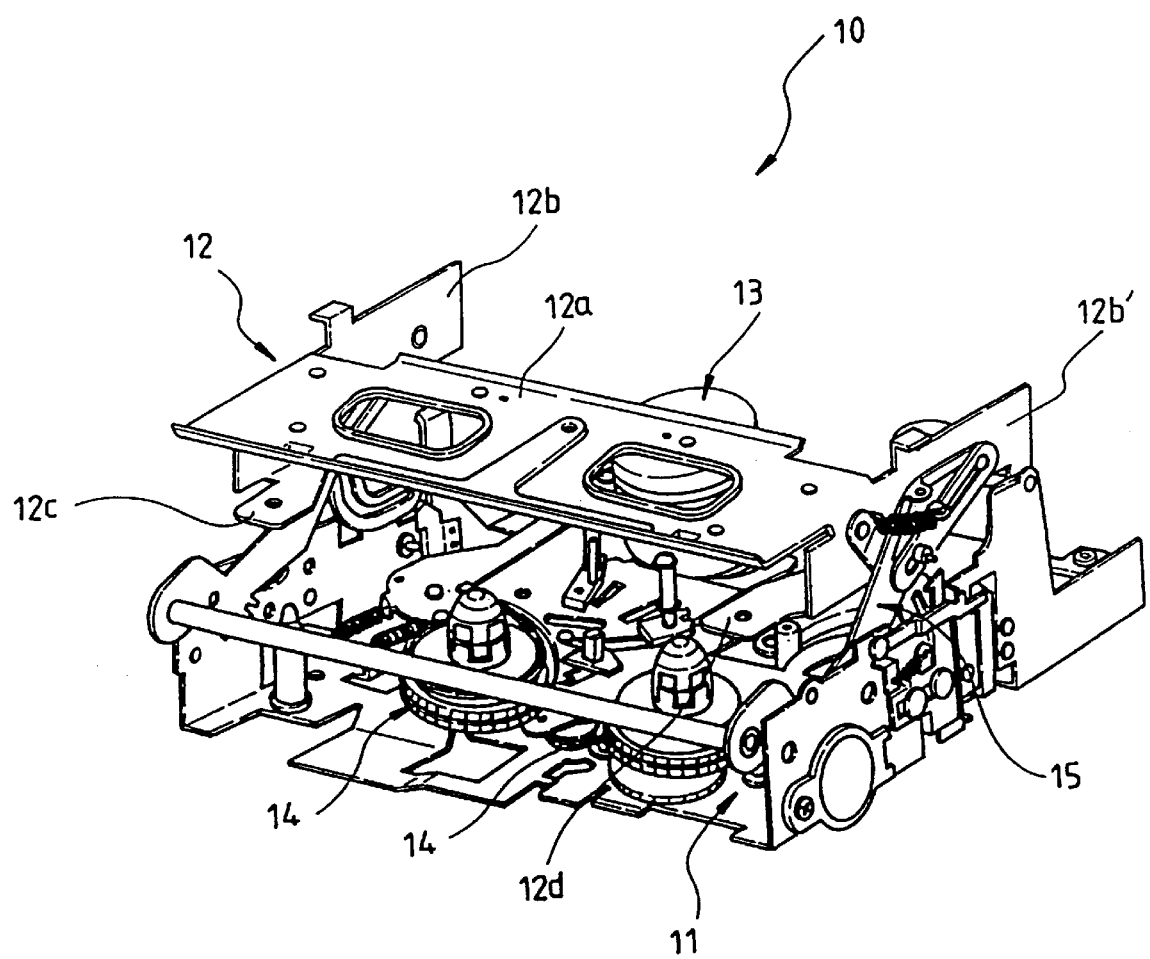
FIG. 1 is a perspective view illustrating a common tape recorder.
Figure 2:
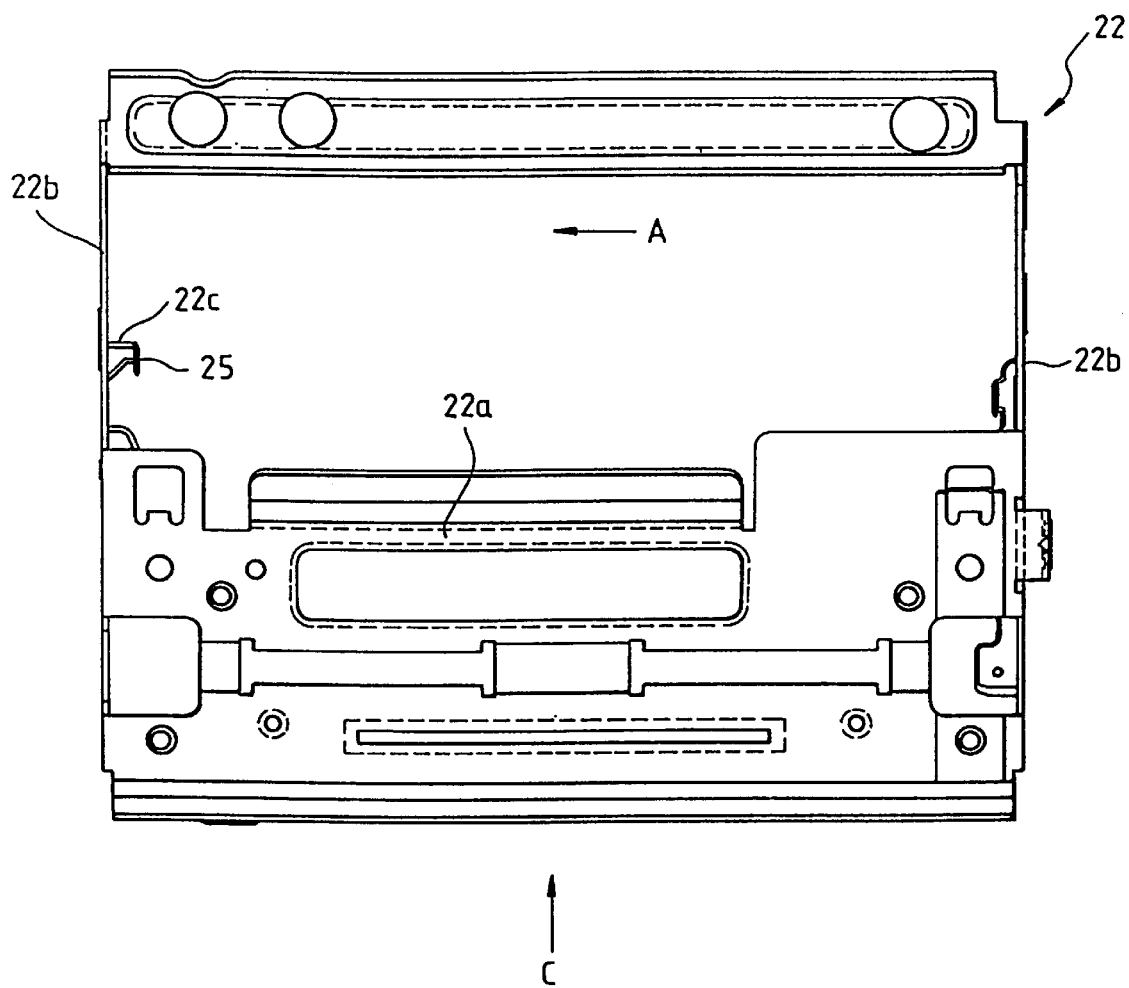
FIG. 2 is a plan view of a cassette housing assembly according to conventional technology.
Figure 3A:
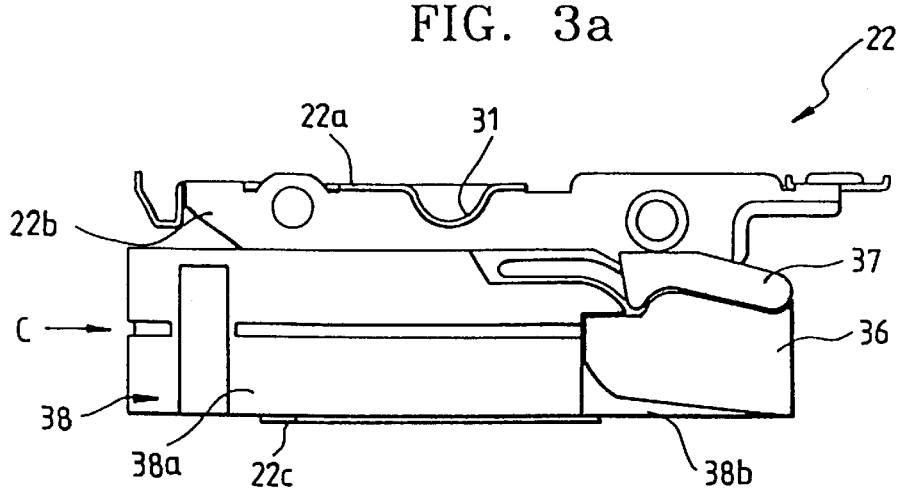
FIGS. 3A and 3B are side views showing the cassette housing assembly in which a cassette is correctly inserted.
Figure 3B:
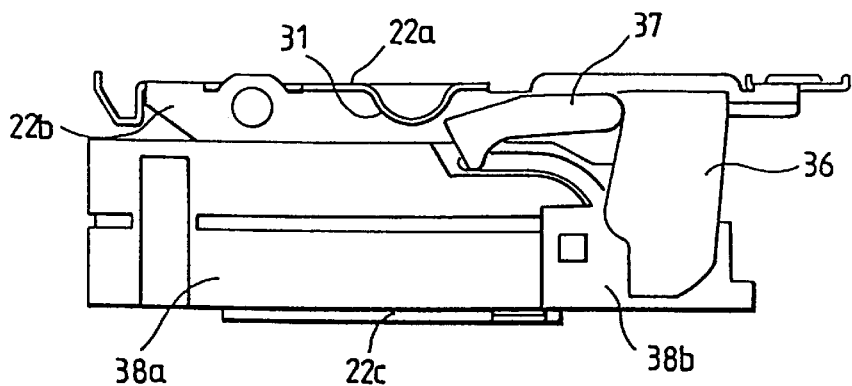
Figure 3C:
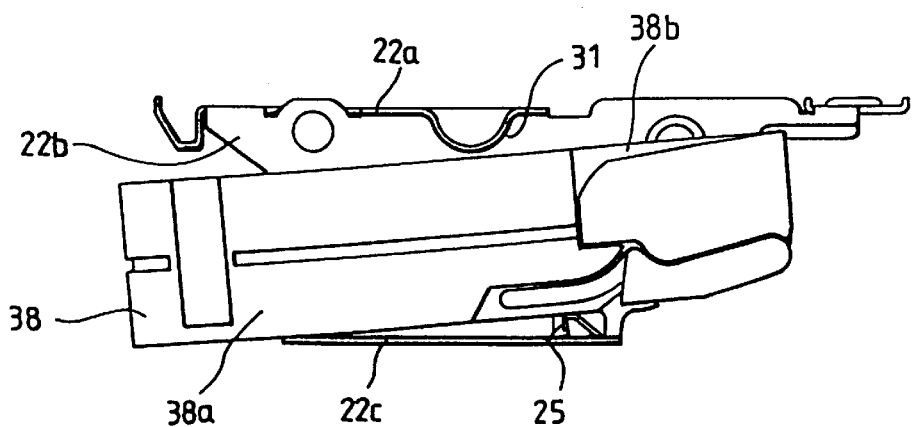
FIG. 3C is a side view showing the cassette housing assembly in which a cassette is incorrectly inserted.

Referring to FIG. 6A, the cassette 38 has been inserted into the cassette housing assembly 42 in a normal state, but has not been lowered to a level of the chassis assembly 11 (see FIG. 1). When the cassette 38 is inserted into the cassette housing assembly 42, the fixed stopper 45 (see FIG. 4) is positioned in the groove formed between the leading portion 38b and the outer lid 36 of the cassette 38. Accordingly, the cassette 38 can enter into the cassette housing assembly 42. Here, the mobile stopper 46 receiving an elastic force by the spring 47 is biased toward the leading portion 38b of the cassette 38.

Referring to FIG. 6B, the cassette 38 is lowered from the position in FIG. 6A to the level of the chassis assembly 11, thus being loaded. As described earlier, when the cassette 38 is loaded, the outer lid 36 of the cassette 38 contacts the lid contact portion (not shown) formed at the side surface of the chassis assembly 11 and the lid 36 is rotated to an open position. Accordingly, the inner lid 37 rotates. As shown in the drawing, the inner lid 37 rotates to the rear of the cassette 38. Then, the inner lid 37 contacts the mobile stopper 46 and moves it backward. That is, since the guide 49 is coupled to the slots 46a of the mobile stopper 46, the mobile stopper 46 moves to the rear of the cassette 38. The distance of the movement of the mobile stopper 46 is restricted by the length of the slots 46a.

For unloading, the cassette 38 returns to the initial state as shown in FIG. 6A. That is, the cassette housing assembly 42 is lifted from the level of the chassis assembly 11 and accordingly the outer lid 36 and the inner lid 37 respectively return to the initial positions. The mobile stopper 46 returns to the initial position by the restoration force of the spring 47.

FIG. 6C shows a state in which the cassette 38 is not correctly inserted. Referring to the drawing, the cassette 38 is inserted upside down. Here, the fixed stopper 45 formed on the lower surface portion 42c of the cassette housing assembly 42 cannot be positioned in the groove (not shown) formed between the leading portion 38b and the outer lid 36 of the cassette 38. The mobile stopper 46 protrudes vertically toward the inside of the space formed in the cassette housing assembly 42. When the cassette 38 enters the cassette housing assembly 42, the fixed stopper 45 contacts the inner lid 37 of the cassette 38 at a point "P2" and the lower portion of the mobile stopper 46 contacts the leading portion 38b of the cassette main unit 38a at point "P1". Since the distance between "P1" and "P2" is less than the thickness "T" of the cassette 38, the cassette 38 cannot be inserted further into the cassette housing assembly 42. Also, as shown in the drawing, in the advanced position of mobile stopper 46 the foremost point of the vertical portion 46c is preferably positioned vertically above the fixed stopper 45 such that "P1" can be approximately located vertically above the "P2".

As described above, in the mis-insertion preventing apparatus according to the present invention, the cassette cannot be inserted deep into the housing so that damages to the cassette and mechanisms and elements installed on a deck can be prevented. In addition, a user can easily notice mis-insertion of the cassette.

It is noted that the present invention is not limited to the preferred embodiment described above, and it is apparent that variations and modifications by those skilled in the art can be effected within the spirit and scope of the present invention defined in the appended claims.

What is claimed is:

1. A cassette housing assembly of a tape recorder having an apparatus for preventing mis-insertion of a cassette comprising:
   a cassette housing having an upper surface portion, side surface portions, and a lower surface portion having a fixed stopper formed at one side thereof, forming a space for receiving a cassette;
   a mobile stopper installed on the lower surface of the upper surface portion of said cassette housing member to be capable of moving along the lower surface; and
   a spring coupled to one side of the lower surface of the upper surface portion of said cassette housing member and one side of said mobile stopper to bias said mobile stopper.

2. The cassette housing assembly as claimed in claim 1, wherein said mobile stopper has a horizontal portion parallel to the upper surface portion of said cassette housing and a vertical portion extending from each side of said horizontal portion.

3. The cassette housing assembly as claimed in claim 2, wherein said vertical portion of said mobile stopper includes at least one point located directly above said fixed stopper when biased in a direction towards insertion of said cassette.

4. The cassette housing assembly as claimed in claim 3, wherein the shortest distance between said fixed stopper and said mobile stopper is less than the thickness of said cassette.

5. The cassette housing assembly as claimed in claim 3, wherein said mobile stopper can be transferred by an inner lid of said cassette against an elastic force by said spring when said cassette is inserted into said cassette housing in a normal state.

6. The cassette housing assembly as claimed in claim 4, wherein said mobile stopper can be transferred by an inner lid of said cassette against an elastic force by said spring when said cassette is inserted into said cassette housing in a normal state.

7. The cassette housing assembly as claimed in claim 2, wherein said mobile stopper can be transferred by an inner lid of said cassette against an elastic force by said spring when said cassette is inserted into said cassette housing in a normal state.

8. The cassette housing assembly as claimed in claim 1, wherein at least one slot is formed on said mobile stopper and a guide is maintained on the upper surface portion of said cassette housing, said guide being positioned within the at least one slot to guide movement of said mobile stopper.

9. The cassette housing assembly as claimed in claim 8, wherein said mobile stopper can be transferred by an inner lid of said cassette against an elastic force by said spring when said cassette is inserted into said cassette housing in a normal state.

10. The cassette housing assembly as claimed in claim 1, wherein said spring is installed between a hook formed on said mobile stopper and a hooking piece formed on the upper surface portion of said cassette housing to bias said mobile stopper in a direction towards insertion of said cassette.

11. The cassette housing assembly as claimed in claim 10, wherein said mobile stopper can be transferred by an inner lid of said cassette against an elastic force by said spring when said cassette is inserted into said cassette housing in a normal state.

12. The cassette housing assembly as claimed in claim 1, wherein said mobile stopper can be transferred by an inner lid of said cassette against an elastic force by said spring when said cassette is inserted into said cassette housing in a normal state.

13. A cassette housing assembly comprising:
   a cassette housing defining a space configured to receive a cassette;
   a first stopper supported by the cassette housing; and
   a second stopper mounted to the housing, the second stopper being movable from a first position to a second position in response to proper insertion of a cassette into the housing space,
   wherein in the first position, the first and second stoppers are positioned to prevent full insertion of a cassette into the housing space.

14. A cassette housing assembly as claimed in claim 13, further including a biasing member, the biasing member being positioned to urge the second stopper towards the first position.

15. A cassette housing assembly as claimed in claim 14, wherein the biasing member includes a spring having a first end secured to the cassette housing and a second end secured to the second stopper.

16. A cassette housing assembly as claimed in claim 13, wherein the second stopper includes a horizontal portion and a vertical portion extending from each end of the horizontal portion.

17. A cassette housing assembly according to claim 16, wherein the horizontal portion of the second stopper has a guide slot configured to slidably receive a guide member secured to the cassette housing.

18. A cassette housing assembly as claimed in claim 16, wherein when the second stopper is in the first position, the vertical portion is positioned a predetermined distance above the first stopper.

19. A cassette housing assembly as claimed in claim 18, wherein the predetermined distance is less than the thickness of a cassette.

20. A cassette housing assembly as claimed in claim 13, wherein the second stopper is positioned to be engaged by a lid of a cassette during proper. insertion of the cassette into the housing space to move the second stopper from the first to the second position.

* * * * *